Oct. 11, 1966   F. H. PELOQUIN   3,277,510
BRUSH TUFT FASTENER
Filed Dec. 8, 1964   2 Sheets-Sheet 1
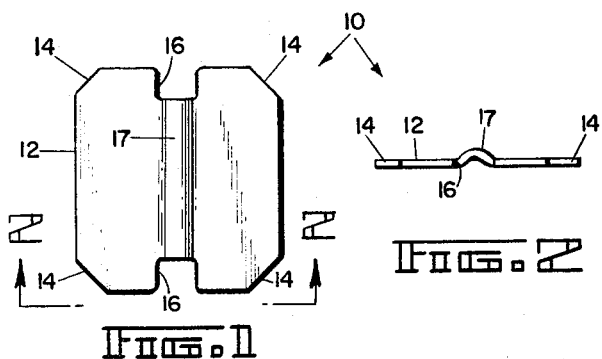
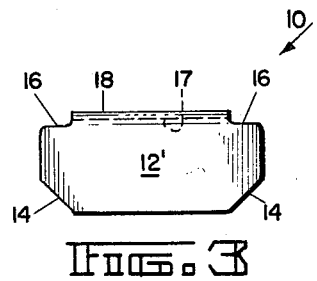
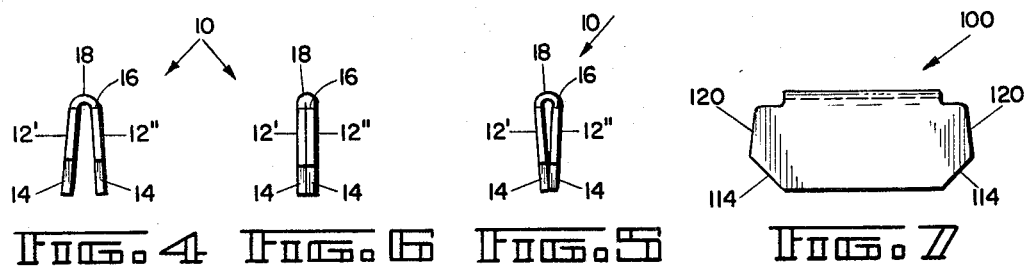
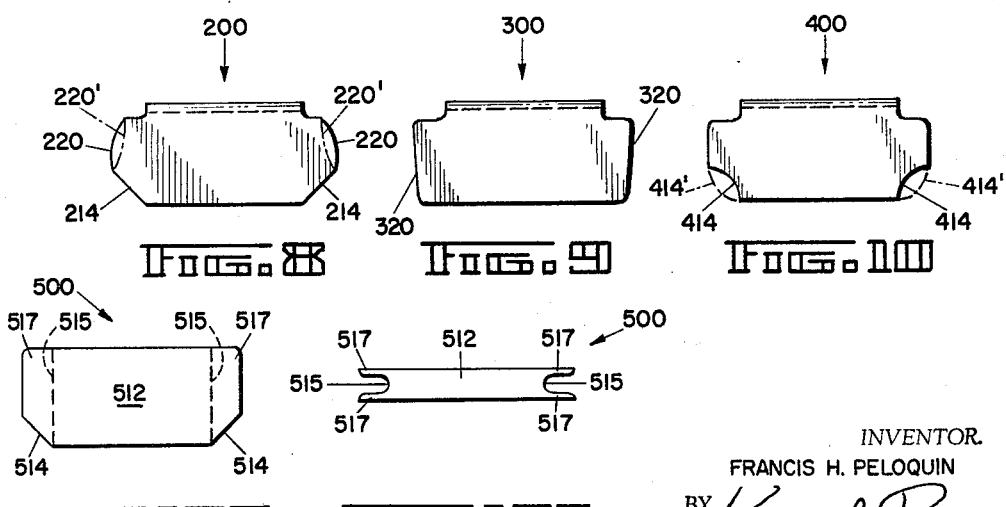
INVENTOR.
FRANCIS H. PELOQUIN
BY Kenwood Ross
ATTORNEY.

Oct. 11, 1966  F. H. PELOQUIN  3,277,510
BRUSH TUFT FASTENER
Filed Dec. 8, 1964  2 Sheets-Sheet 2
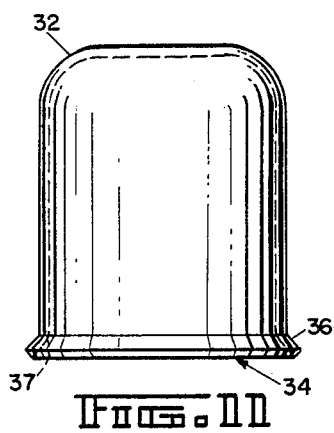
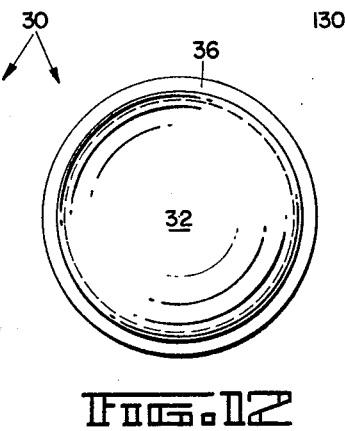
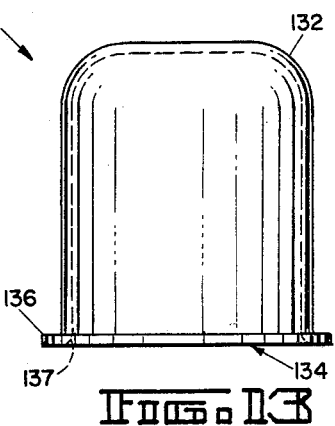
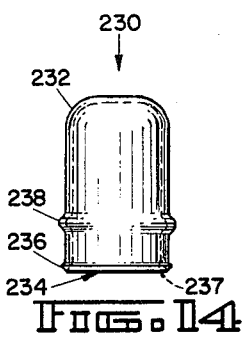
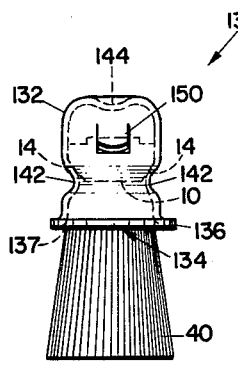
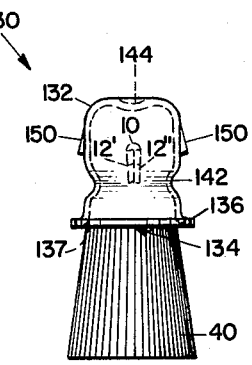
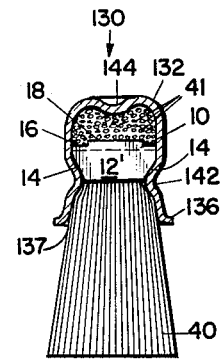
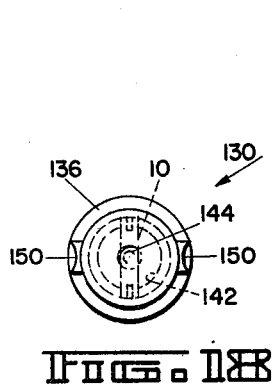
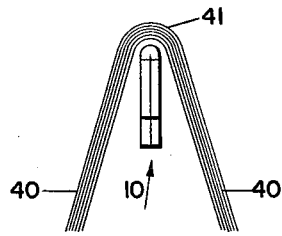
INVENTOR.
FRANCIS H. PELOQUIN
BY Kenwood Ross
ATTORNEY.

United States Patent Office 3,277,510
Patented Oct. 11, 1966

3,277,510
BRUSH TUFT FASTENER
Francis H. Peloquin, 6 Progress Ave., Rockville, Conn.
Filed Dec. 8, 1964, Ser. No. 416,732
5 Claims. (Cl. 15—190)

My invention relates to new and useful improvements in a brush construction and is directed more particularly to the provision of a novel implement characterized by a locking member in the nature of a lock beam wedge which is arranged to wedge a plurality of bristles in a locked position within a ferrule or cup which is in turn insertable into an appropriate opening in a backing, holder or the like so as to form a brush.

A primary object of my invention is to provide a locking beam wedge and ferrule combination which is susceptible of virtually endless modification so as to permit its adaptation to use in the formation of bristle tufts under practically all existing customer and/or manufacturing requirements.

It is a still further object to provide a device of the type described which is constructed of relatively simple parts which are adapted to be readily assembled and which when once assembled are positively and securely retained in operative relationship and which cannot be readily and accidentally separated from each other.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

FIG. 1 is a top plan view of a preferred form of lock beam wedge according to the invention before folding;

FIG. 2 is a front elevational view taken on the line 2—2 of FIG. 1;

FIG. 3 is a side elevational view of the lock beam wedge of FIG. 1 after folding;

FIG. 4 is an end elevational view showing the configuration of the lock beam wedge of FIG. 3 before insertion into a ferrule or cup;

FIG. 5 is an end elevational view showing the configuration of the lock beam wedge of FIG. 3 after insertion into a ferrule or cup;

FIG. 6 is an end elevational view similar to FIG. 5, showing the configuration of the lock beam wedge after necking of the ferrule or cup;

FIGS. 7–10A are side elevational views of modified lock beam wedges according to the invention;

FIG. 10B is a top plan view of the lock beam wedge of FIG. 10A;

FIG. 11 is an elevational view of one form of ferrule or cup used in conjunction with the lock beam wedges of FIGS. 1–10B;

FIG. 12 is a top plan view of the ferrule or cup of FIG. 11;

FIG. 13 is an elevational view of another form of ferrule or cup;

FIG. 14 is an elevational view of still another form of ferrule or cup;

FIG. 15 is a front elevational view of a formed brush using the lock beam wedge of FIGS. 1–6, the lock beam wedge having bristles folded thereover and being disposed within a necked ferrule or cup of the type shown in FIG. 13;

FIG. 16 is a side elevational view of the formed brush of FIG. 15;

FIG. 17 is a front elevational view similar to FIG. 15 with portions of the ferrule or cup broken away;

FIG. 18 is a top plan view of the formed brush of FIG. 15; and

FIG. 18A is a somewhat schematic view showing the manner in which bristles are folded over a lock beam wedge according to the invention.

In the accompanying drawings, I have illustrated various physical embodiments of the invention in which the parts are combined and arranged in accordance with several modes which I have devised for the practical application of the principles of the invention.

It will, however, be understood that changes and alterations are contemplated and may be made in these exemplifying drawings and mechanical structures, within the scope of the claims, without departing from the principles of the invention.

In the following description and claims, various details will be identified by specific names for convenience. These names, however, are intended to be as generic in their application as the art will permit.

Referring now to the drawings more in detail, in which similar characters of reference indicate corresponding parts in the several figures and referring more particularly to FIGS. 1–6, I have shown a lock beam wedge generally indicated by the numeral 10 which, as will appear, is used in conjunction with a cup or ferrule to hold brush bristles in situ relative to such cup or ferrule.

The lock beam wedge is shown in FIGS. 1 and 2 in an unfolded position, and is preferably, but not obligatorily, formed from flat metal stock to provide a body 12 bevelled as at 14 to provide wedge angles at each of its diagonally opposite corners and notched or cut out as at 16 at a pair of its opposite side edges for purposes to appear.

The lock beam wedge could, alternatively, be formed from solid stock as shown in FIGS. 10A and 10B, shortly to be more fully described.

Said notches or cut-outs, which comprise a pair, are oppositely-facing and extend inwardly from the side edges of body 12 along a central axis of the latter. A folding crease 17 extends between the notches 16 on said central axis and facilitates folding of the wedge, as will appear.

The notches or cut-outs 16 permit the transfer of a folded lock beam wedge and a tuft of bristles into a ferrule or cup in manner to be described.

The lock beam wedge is folded by swaging or the like to any of the positions of FIGS. 3–6 along the folding crease 17 to provide a pair of half portions 12' and 12" interconnected along their upper edges by said folding crease which now defines a web portion 18.

In FIG. 4, the lock beam wedge is shown as only partially folded before its insertion into a ferrule or cup, to be described; in FIG. 5 the lock beam wedge is shown as completely folded but with the half-portions in contact only at their lower ends, this being their relative positions following insertion into a ferrule or cup; and in FIG. 6 the lock beam wedge is shown as completely folded with the half portions 12' and 12" being in surface contact, this being their relative positions following insertion into a ferrule or cup and necking of the latter.

In FIGS. 7–10B I have shown modified forms of lock beam wedges embodying the invention, again each form being designed for use with a specific ferrule or cup.

In FIG. 7, the half-portions of a lock beam wedge 100 are bevelled at their lower corners at 114 to provide wedge angles as with the preferred embodiment of FIGS. 1–6, and the said half-portions are additionally bevelled to provide end walls 120 which incline upwardly and inwardly from bottom to top.

In FIG. 8, the half-portions of a lock beam wedge 200 are bevelled at their lower corners at 214 to provide wedge angles and the opposite ends of said half-portions are rounded or curved so as to be convex, as indicated at 200, or concave, as indicated at 220'.

In FIG. 9, the half-portions of a lock beam wedge 300 are not bevelled at their lower corners, but the half-portions are bevelled to provide end walls 320 which incline downwardly and inwardly from top to bottom.

In FIG. 10, the half-portions of a lock beam wedge 400 are not bevelled at their lower corners but rather are provided at such lower corners with a fillet 414 or a radius 414'.

In FIGS. 10A and 10B, a lock beam wedge 500 formed from shaped solid stock, comprises a body portion 512 bevelled at its lower corners at 514 to provide wedge angles and vertically grooved at 515 at its opposite ends, said grooves each facing outwardly at each end of the body portion and providing a pair of compressible fingers 517, which are adapted to be compressed upon insertion into a ferrule or cup.

The solid lock beam wedge may, if desired, incorporate the corner and end configurations of any of the lock beam wedges of FIGS. 3–10.

From the foregoing, it will be obvious that a virtually endless variety of lock beam wedges according to the invention may be provided, employing either folded or solid designs.

In FIGS. 11 and 12 I have shown a somewhat bell-like cup or ferrule generally indicated by 30 into which the lock beam wedges are insertible in the manner of a press fit. Ferrule 30 is provided with a rounded upper or top portion 32 and an open lower or bottom portion 34 terminating in a downwardly-extending flange 36 on all sides of the ferrule, chamfered or rounded as at 37 so as not to present rough or sharp edges thereby obviating any undesired cutting action on bristles inserted thereinto.

The inner diameter of ferrule 30 is such that the opposite end walls of a lock beam wedge will bind against the inner wall of the ferrule upon insertion into the open mouth of the latter.

The modified ferrule or cup 130 of FIG. 13 is provided with a rounded upper or top portion 132 and an open lower or bottom portion 134 terminating in an outwardly-extending flange 136 on all sides of the ferrule, rounded or chamfered as at 137.

In FIG. 14 I have shown still another modified form of ferrule 230 comprising a rounded upper or top portion 232 and an open lower or bottom portion 234 terminating in a downwardly-extending flange 236 on all sides of the ferrule rounded or chamfered as at 237. Spaced upwardly from flange 236 is an outwardly-extending neck-bead 238 which completely encircles lower or bottom portion 234. Neck-bead 238 permits the accommodation of stiffer bristles by the ferrule.

With reference now to FIGS. 15–18, I have shown a formed brush comprising a tuft of bristles 40 wedged within a ferrule 130, the bristles having been folded over a lock beam wedge 10 in manner as shown in FIG. 18A before insertion into the ferrule.

It will be observed that the side wall of the ferrule upwardly of flange 136 has been deformed inwardly as by "necking" to provide an inwardly-extending peripheral bead 142 which tightly embraces and substantially follows the contour of the wedge angles formed by the bevelled edges 14 on the half-portions 12' and 12" of the lock wedge beam.

Upper portion of ferrule 130 has additionally been provided with an inwardly extending indent cavity 144 centrally thereof, said indent cavity serving to further compact and wedge within the ferrule the web portion of the bristles, identified at 41 in FIG. 18A, and which is disposed over the upper edge of the lock beam wedge.

On opposite sides of ferrule 130 and spaced upwardly of bead 142 outwardly extending lock tabs 150 are provided. While two such tabs are shown in the drawing, additional tabs may be provided as desired.

The ferrules, when tufted as above described, are pressed through holes or openings in any desired type of holder or backing member whereby a brush is made.

The top side of the flange acts as a stop against the entrance of the hole or opening in the holder or backing member and the lock tabs 150 act as locks on the opposite ends of the ferrule so as to retain said ferrule within the opening.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Brush construction for insertion in the opening of a holder comprising, a bristle ferrule having a relatively thin circular and vertical side wall and closed and open upper and lower ends, a substantially flat lock beam wedge within said ferrule having opposite ends frictionally engaging opposite sides of the side wall of said ferrule, elongate bristles folded over said lock beam wedge and having upper portions wedged within said ferrule by said lock beam wedge and opposite portions thereof extending downwardly and outwardly of said ferrule, portions of the side wall of the ferrule being displaced inwardly to bear on said lock beam wedge restraining said lock beam wedge against axial movement relative to said ferrule, a portion of the upper wall of the ferrule being displaced inwardly to bear on the upper portions of the bristles folded over the lock beam wedge, and portions of the side wall of the ferrule being displaced outwardly forming lock tabs for retaining said ferrule in an opening of a holder into which said ferrule is inserted.

2. Brush construction according to claim 1 wherein the portions of said lock beam wedge bearing against the ferrule side wall are bevelled.

3. Brush construction according to claim 1 wherein the portions of said lock beam wedge bearing against the ferrule side wall define a radius.

4. Brush construction according to claim 1 wherein the portions of said lock beam wedge bearing against the ferrule side wall define a fillet.

5. Brush construction according to claim 1 wherein the lower end of the ferrule side wall defines a peripheral flange.

References Cited by the Examiner

UNITED STATES PATENTS

| | | | |
|---|---|---|---|
| 2,409,490 | 10/1946 | Jobst | 15—190 |
| 2,771,625 | 11/1956 | Peloquin | 15—190 |
| 2,982,983 | 5/1961 | Peterson | 15—180 |
| 2,989,767 | 6/1961 | Charvat | 15—180 X |
| 3,007,188 | 11/1961 | Dolan | 15—195 X |
| 3,109,190 | 11/1961 | Nelson | 15—181 |

FOREIGN PATENTS

| | | |
|---|---|---|
| 581,576 | 7/1933 | Germany. |
| 591,887 | 1/1934 | Germany. |

CHARLES A. WILLMUTH, *Primary Examiner.*

P. FELDMAN, *Assistant Examiner.*